US011442314B2

(12) United States Patent
Mao (10) Patent No.: US 11,442,314 B2
(45) Date of Patent: Sep. 13, 2022

(54) POLARIZATION INSENSITIVE LIQUID CRYSTAL ON SILICON (LCOS) PHASE MODULATORS AND RELATED DEVICES AND METHODS

(71) Applicant: Chongchang Mao, Chapel Hill, NC (US)

(72) Inventor: Chongchang Mao, Chapel Hill, NC (US)

(73) Assignee: Chongchang Mao, Chapel Hill, NC (US)

( * ) Notice: Subject to any disclaimer, the term of this patent is extended or adjusted under 35 U.S.C. 154(b) by 0 days.

(21) Appl. No.: 17/393,750

(22) Filed: Aug. 4, 2021

(65) Prior Publication Data

US 2022/0050333 A1    Feb. 17, 2022

Related U.S. Application Data

(60) Provisional application No. 63/064,032, filed on Aug. 11, 2020.

(51) Int. Cl.
*G02F 1/133*     (2006.01)
*G02F 1/13363*   (2006.01)
*G02F 1/1343*    (2006.01)

(52) U.S. Cl.
CPC .... *G02F 1/133638* (2021.01); *G02F 1/13439* (2013.01); *G02F 2203/06* (2013.01);
(Continued)

(58) Field of Classification Search
CPC ........... G02F 1/133638; G02F 1/13439; G02F 2203/06; G02F 2203/50; G02F 2413/01; G02F 2413/05
(Continued)

(56) References Cited

U.S. PATENT DOCUMENTS 7,034,979 B1   4/2006 Feng et al.
7,006,165 B1   8/2006 Miller et al.
(Continued)

OTHER PUBLICATIONS

"Metal nano-grid reflective wave plate", Y. Pang and R. Gordon, Opt. Express 17, 2871-2879 (2009).
"Polarization dependence of optical properties of metal-dielectric gratings with sub-wavelength grooves in classical and conical mounts," A. Venguriekar, J. Appl. Phys. 104, 023, 109-1-023, 109-8 (2008).
(Continued)

*Primary Examiner* — Nathanael R Briggs
*Assistant Examiner* — William D Peterson
(74) *Attorney, Agent, or Firm* — Stanek Lemon Crouse & Meeks, PA (57) ABSTRACT

A polarization insensitive optical phase modulator is provided including a glass substrate; a liquid crystal element; a first electrode on a first surface of the liquid crystal element adjacent the glass substrate; a second electrode on a second surface of the liquid crystal element, opposite the first surface, the first and second electrodes supplying an electric potential across the liquid crystal element to drive liquid crystals in a predetermined configuration; and a silicon backplane on the second electrode opposite the liquid crystal element. The first electrode is a transparent electrode to a selected wavelength and is on a surface of the glass substrate. The second electrode includes individually addressable pixels and reflection metal mirrors on pixel surfaces and is on a surface of the silicon backplane. The modulator further includes a polymer quarter-wave plate (QWP) between the second electrode and the liquid crystal element, the polymer QWP having an optical axis at 45 degrees to liquid crystal slow axis.

19 Claims, 4 Drawing Sheets (52) U.S. Cl.
CPC ...... *G02F 2203/50* (2013.01); *G02F 2413/01* (2013.01); *G02F 2413/05* (2013.01)

(58) Field of Classification Search
USPC .......................................................... 349/117
See application file for complete search history.

(56) References Cited

U.S. PATENT DOCUMENTS

| | | | |
|---|---|---|---|
| 7,460,101 | B2 | 12/2008 | Lee et al. |
| 7,859,640 | B2 | 12/2010 | Galstian et al. |
| 8,643,822 | B2 * | 2/2014 | Tan .................. G03H 1/22 349/129 |
| 9,065,707 | B2 * | 6/2015 | Frisken .................. H04L 27/18 |
| 9,201,286 | B2 | 12/2015 | Mao et al. |
| 9,588,374 | B2 | 3/2017 | Anderson et al. |
| 9,774,930 | B2 | 9/2017 | Chu et al. |
| 10,473,839 | B2 | 11/2019 | Anderson et al. |

OTHER PUBLICATIONS

"Liquid-crystal phase modulator for unpolarized light", G. D. Love, Applied Optics 32, 2222-2223 (1993).

"High-Contrast, Fast-Switching Liquid Crystal-On-Silicon Microdisplay With a Frame Buffer Pixel Array", Sangrok Lee, Michael Sullivan, Chongchong Mao, Kristina M Johnson, Opt. Lett., 29 (2), 751-753, (2004).

"Polarization-Insensitive Variable Optical Attenuator and Wavelength Blocker Using Liquid Crystal Polarization Gratings", Elena Nicolescu, Chongchang Mao, Amir Fardad, Michael Escuti, Lightwave Technology. 28 (21), 3121-3127, (2010).

"Polarization-Independent Switching with High Contrast From a Liquid Crystal Polarization Grating", Michael Escuti and W. Michael Jones, SID 06 Digest, 1443-1446 (2006).

Notification of Transmittal of the International Search Report and the Written Opinion, PCT/US2021/044471, dated Oct. 21, 2021, 7 pages.

* cited by examiner

(A). STEP 1: LPP COATING AND UV EXPOSURE.

FIG. 3A (B). STEP 2: LCP COATING AND UV EXPOSURE

(A). EXAMPLE OF A FRAME BUFFER PIXEL DIAGRAM

FIG. 5A (B). CONTROL TIMING DIAGRAM

FIG. 5B

POLARIZATION INSENSITIVE LIQUID CRYSTAL ON SILICON (LCOS) PHASE MODULATORS AND RELATED DEVICES AND METHODS

CLAIM OF PRIORITY

The present application claims priority to U.S. Provisional Application No. 63/064,032, filed on Aug. 11, 2020, entitled Polarization Insensitive Liquid Crystal on Silicon (LCOS) Phase Modulator, the contents of which are hereby incorporated herein by reference as if set forth in its entirety.

FIELD

The present inventive concept relates generally to phase modulator devices and, more particularly, to optical polarization insensitive liquid crystal based optical phase modulators.

BACKGROUND

Liquid crystal on silicon (LCOS) devices are used, for example, as optical phase modulators, among other applications. LCOS devices can spatially manipulate optical signals by applying a spatially dependent phase profile to the signals. This has many applications, including beam steering, spectral compensation, front wave shaping, and holographic display.

Figure 1:
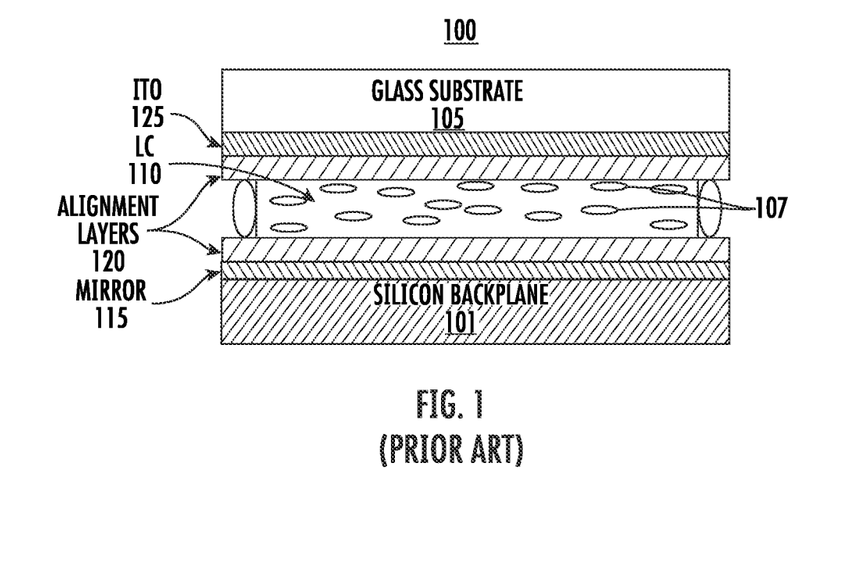
FIG. 1 is a schematic side view of a conventional polarization dependent liquid crystal on silicon (LCOS) device.

Referring to FIG. 1, a side-view of a conventional LCOS device 100 will be discussed. As illustrated, the LCOS device 100 includes a liquid crystal (LC) material 110 between a transparent glass substrate 105 having a transparent electrode 125, and a metal mirror 115 mounted on a silicon substrate 101. The transparent electrode 125 may be an Indium Tin Oxide (ITO) electrode. The mirror 115 is divided into a two-dimensional (2-D) array of individually addressable pixels. Each pixel is individually drivable by a voltage signal to provide a local phase change to an optical signal, thereby providing a two-dimensional array of phase manipulating regions. The liquid crystal element is pre-aligned by two alignment layers 120 which are disposed on the surfaces of the glass substrate 105 and the silicon substrate 101, respectively.

As illustrated in FIG. 1, a liquid crystal material 110 includes elongated molecules 107 that have a large scale orientational order and may have a position order or no position order depending on the materials used. Due to the elongated shape and ordered orientation of liquid crystals 107, a liquid crystal element 110 behaves as an anisotropic dielectric element, having an axis of birefringence in the direction of the long axis of the molecules. Therefore, liquid crystal devices, such as LCOS devices, are generally inherently polarization dependent. Consequently, light incident onto a conventional LCOS device will have one linear polarization component modified in phase to a greater degree than the orthogonal component.

Removal or compensation of the polarization dependence of liquid crystals may reduce or remove the need for implementing polarization diversity into the optical device. This may potentially reduce the cost and complexity of optical system, and may also improve the optical performance. Several techniques for rendering a liquid crystal polarization independent phase modulator are discussed below.

One technique uses a waveplate formed from a periodic grid structure comprised of alternating metal and dielectric regions. Such a grid structure may achieve polarization independent attenuation in a dichroic LC cell or for polarization modulated vertical cavity surface emitting lasers. For other optical applications, more advanced control of phase and polarization is required.

Another technique uses a sub-wavelength grating for polarization independent LCOS. In general, the anisotropic material profile which is called reflection sub-wavelength grating is configured to introduce, to incident light, a relative phase difference of 180°, thereby reflecting each polarization component in an orthogonal orientation. Therefore, the sub-wavelength grating behaves like a form-birefringent half-wave plate (HWP). When the light passes through the LC layer, light with the polarization parallel to the LC alignment direction is phase modulated more than the orthogonal polarization light, and when the reflected light passes through LC layer again, that orthogonal polarization is phase modulated more than the other. Therefore, a light beam can be polarization independently phase modulated.

Each addressable pixel of the subset includes a reflective sub-wavelength grating structure and the grating structure has a periodic metallic profile which is formed on the pixel electrode. This method has the advantage of low voltage drop across the sub-wavelength grating. However, it has some disadvantages, such as it needs a special LCOS silicon backplane fabrication process for making the grating, resulting in high cost and low yield; the metal layer (before etching) is several times of thickness as compared to a general LCOS pixel mirror, resulting in difficulty to make high quality grating; and due to the thick metal layer, it is difficult to etch out small pixel gaps, resulting in reduced pixel fill factor. In summary, using such a technique, it may be difficult to make a polarization independent LCOS with low cost and high performance.

Another sub-wavelength metal grating structure on the surface of the LCOS silicon backplane is also discussed. The fabrication process for such a sub-wavelength grating may include: disposing a dielectric spacer layer over a reflective top face of a silicon backplane substrate; forming a sub-wavelength metal grating over the spacer layer that is a plurality of parallel spaced apart metal strips; and then disposing a grating cap layer over the sub-wavelength metal grating.

The main advantage of this method as compared with the methods discussed above is that the fabrication process of a sub-wavelength grating is simplified. However, the fabrication process is still relatively complicated, and it still generally requires a special silicon backplane process. The disadvantages may include: needing a thick dielectric separation layer between the electrical pixel mirror and the grating metal strips, resulting in relatively large potential voltage drop across the dielectric layer; and having a high penetration of one polarization light into the separation dielectric layer and so the reflected light from a pixel mirror is partially blocked by the grating metal strips, resulting in high polarization dependent loss (PDL), therefore it may be difficult to realize polarization independent phase modulation.

It has been suggested that a standard pneumatic liquid crystal LC could be made to be polarization insensitive through the combination of a double pass of the LC and a quarter-wave plate. However, the quarter-wave plate is thick and it may not be suitable to be used in LCOS devices.

A polarization independent variable optical attenuator has been developed using a quarter-wave plate (QWP) between a reflection mirror and a LC phase modulator. The QWP is a crystal plate, so it is difficult to use such a technique in a polarization insensitive LCOS.

Thus, each of the conventional techniques for providing polarization insensitive liquid crystal operation discussed above have relative disadvantages or shortfalls. Accordingly, improved techniques are desired.

SUMMARY

Some embodiments of the present inventive concept provide a polarization insensitive optical phase modulator including a glass substrate; a liquid crystal element; a first electrode on a first surface of the liquid crystal element adjacent the glass substrate; a second electrode on a second surface of the liquid crystal element, opposite the first surface, the first and second electrodes supplying an electric potential across the liquid crystal element to drive liquid crystals in a predetermined configuration; and a silicon backplane on the second electrode opposite the liquid crystal element. The first electrode is a transparent electrode to a selected wavelength and is on a surface of the glass substrate. The second electrode includes individually addressable pixels and reflection metal mirrors on pixel surfaces and is on a surface of the silicon backplane. The modulator further includes a polymer quarter-wave plate (QWP) between the second electrode and the liquid crystal element, the polymer QWP having an optical axis at 45 degrees to a liquid crystal slow axis. The reflected light has a 90 degree polarization rotation before traversing the liquid crystal element a second time. The reflected light passing through the liquid crystal element the second time has a different phase modulation from that of incident light passing through the liquid crystal element a first time, such that output light has a same phase modulation for both polarization components.

Further embodiments of the present inventive concept provide a liquid crystal on silicon (LCOS) device providing a substantially polarization independent response to input light, the LCOS device including a glass substrate having first and second opposing surfaces; a silicon backplane having first and second opposing surfaces; a liquid crystal material between the first surface of the glass substrate adjacent the liquid crystal material and the first surface of the silicon backplane adjacent the liquid crystal material; a first electrode on the glass substrate between the glass substrate and the liquid crystal material, the first electrode being a transparent electrode that provides a common potential voltage $V_{com}$; and a second electrode on a frame buffer pixel circuit that includes a first electric gate, a source follower, and a second electric gate. The second electrode in a pixel is not limited to frame buffer pixel circuit.

Still further embodiments of the present inventive concept provide methods of fabricating a polymer quarter-wave plate (QWP) for a polarization insensitive optical phase modulator, the method including providing a silicon backplane; forming a second electrode on the silicon backplane, the second electrode including individually addressable pixels and reflection metal mirrors on pixel surfaces; forming an linear photo-polymerization (LPP) layer on the second electrode; exposing the LPP layer to polarized ultra-violet (UV) light; forming a liquid crystal polymer (LCP) layer on the exposed LPP layer; and exposing the LCP layer to un-polarized UV light to provide the polymer quarter-wave plate (QWP) between the second electrode and a liquid crystal element.

BRIEF DESCRIPTION OF THE DRAWINGS

Some embodiments of the present inventive concept will now be described, by way of example only, with reference to the accompanying drawings in which.

DETAILED DESCRIPTION

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As discussed above, sensitivity of the liquid crystal (LC) variable retarders and optical phase modulators to the polarization of the optical beam may be a disadvantage in applications where the polarization state of the incident light is not controlled. Accordingly, some embodiments of the present inventive concept provide a polarization insensitive optical phase modulator including a liquid crystal element, disposed between a pair of opposing electrodes. As will be discussed further below with respect to the figures, in some embodiments, the first electrode is a transparent electrode on the glass substrate and the second electrode is a pixel electrode on the silicon backplane. On the silicon substrate surface, a birefringent liquid crystal polymer layer is disposed as a quarter-wave plate (QWP), which may have an optical axis at, for example, 45° to the liquid crystal slow axis. The quarter-wave plate discussed herein operates in a double-pass manner as the half-wave plate (HWP), and switches the polarization state of the reflected light to an orthogonal polarization state. In these embodiments, light that is linearly polarized either parallel or orthogonal to the LC director traverses through the LC layer once in its original polarization state, and once in an orthogonal polarization state, resulting in a polarization independent operation.

The sensitivity of the LC variable retarders and optical phase modulators to the polarization of the optical beam may be a disadvantage in applications where the polarization state of the incident light is not controlled. To reduce polarization dependence for liquid crystal on silicon (LCOS), a sub-wavelength grating as the HWP have been proposed to fabricate on the surface of silicon backplane. These devices have the advantage of relatively low voltage drop across the grating layer. However, implementation on the surface of LCOS pixel electrodes may considerably complicate the LCOS fabrication process and may also make it very difficult to produce high performance devices using such techniques.

Accordingly, some embodiments of the present inventive concept provide a method for making a PI-LCOS device that incorporates a "thin" quarter-wave plate (QWP) on the reflection surface of a silicon backplane. A QWP here operates in double-pass manner as the half-wave plate (HWP), and switches the polarization state of the reflected light to an orthogonal polarization state. In such an arrangement, light that is linearly polarized either parallel or orthogonal to the LC director travels through the LC layer once in its original polarization state, and once in an orthogonal polarization state, resulting at least in theory in a polarization independent operation. One disadvantage to this method is that the addition of a waveplate between silicon electrode and LC element results in some voltage drop across the waveplate and therefore may increase the required operating voltage of the device as compared with a general LCOS device.

In some embodiments of the present inventive concept, a frame buffer pixel circuit is provided. With frame buffer pixel circuits, a high driving voltage can be provided by adjusting the potential voltage on the first electrode said common electrode ($V_{com}$). $V_{com}$ can be provided by an electronic board outside of the LCOS device which has relatively no impact on the LCOS design and the fabrication. Therefore, such a silicon backplane can be fabricated by using a common LCOS silicon backplane fabrication process as will be discussed further herein.

Figure 2:
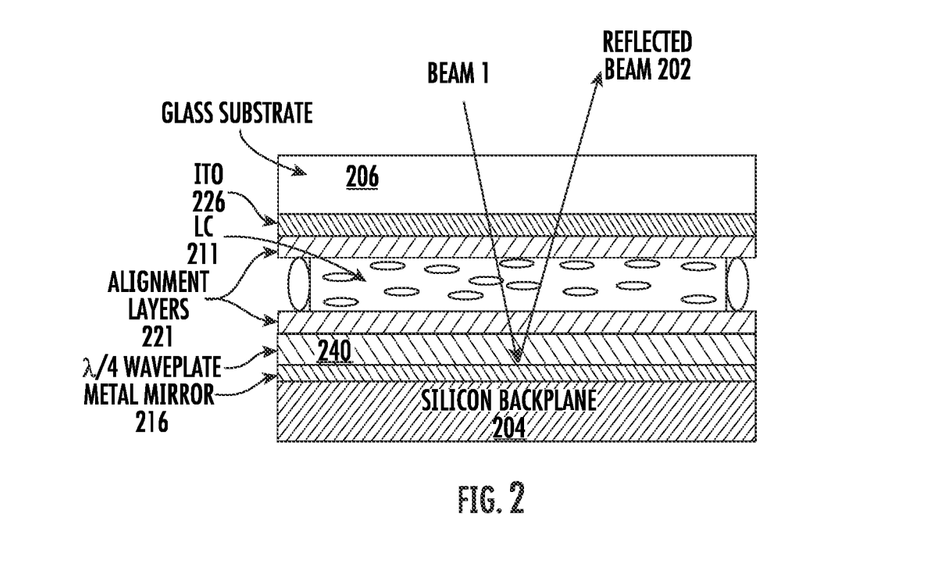
FIG. 2 is a schematic side view of a liquid crystal device including a quarter-wave plate (QWP) on a silicon backplane of a LCOS in accordance with some embodiments of the present inventive concept.

Referring now to FIG. 2, a side view of a PI-LCOS 202 in accordance with some embodiments of the present inventive concept will be discussed. As illustrated, PI-LCOS includes a glass substrate 205; a first electrode (ITO) 226; a first LC alignment layer 221; a silicon backplane 204; a second electrode provided by a metal mirror 216; a QWP (A14 waveplate) 240; a second LC alignment layer 221; and an LC layer 211. It will be understood that FIG. 2 is provided as an example only and that embodiments of the present inventive concept are not limited to this particular configuration.

Referring again to FIG. 2, the glass substrate 206 is provided on the LC layer 211 to contain the LC 211 having a uniform thickness between the glass substrate 206 and the silicon backplane 204. The LC layer 211 may have a thickness of from about 2 um to about 10 um without departing from the scope of the present inventive concept, depending on LC material birefringence and application light wavelength. The first electrode (ITO) 211 is on the glass substrate 206 and is transparent to the used light wavelength. A first LC alignment layer 221 is positioned on a surface of the first electrode 125. The silicon backplane 204 has a two-dimensional (2-D) pixel array with a frame buffer pixel circuit in each pixel. The metal mirror 216 positioned on the silicon backplane 204 at the top of each pixel provides potential voltage to drive LC and also to reflect incident light. The QWP 240 on the pixel mirrors 216 (second electrode) has an optical axis at, for example, 45° or a selected angle to the LC alignment direction. A second LC alignment layer 221 is on the QWP 240. As discussed above, the QWP 240 is a "thin" layer. As used herein, "thin" refers to a thickness of from about 0.4 um to about 4 um, depending on material birefringence and application light wavelength. The LC layer 211 is provided between two alignment layers 221 and provides a light phase modulation.

In operation, when an optical beam (Beam 1) is incident upon the PI-LCOS 202 from glass substrate 206 side, the beam passes through the LC layer 211 and then through the QWP layer 240 a first time and is reflected from the pixel mirrors 216. It then passes through the QWP 240 a second time (Reflected Beam). In this example, the QWP behaves as the HWP with double-pass configuration, so it switches the polarization state of the light to an orthogonal polarization state. In these embodiments, light that is linearly polarized either parallel or orthogonal to LC director travels through the LC layer once in its original polarization state, and once in an orthogonal polarization state, resulting in a polarization insensitive operation in accordance with embodiments discussed herein.

In some embodiments of the present inventive concept, a liquid crystal polymer (LCP) material is used to form a QWP on the surface of a silicon backplane. The fabrication process of polarization diffraction grating and optical waveplates has been developed and the LCP based devices have been already used in some products.

Figure 3A:
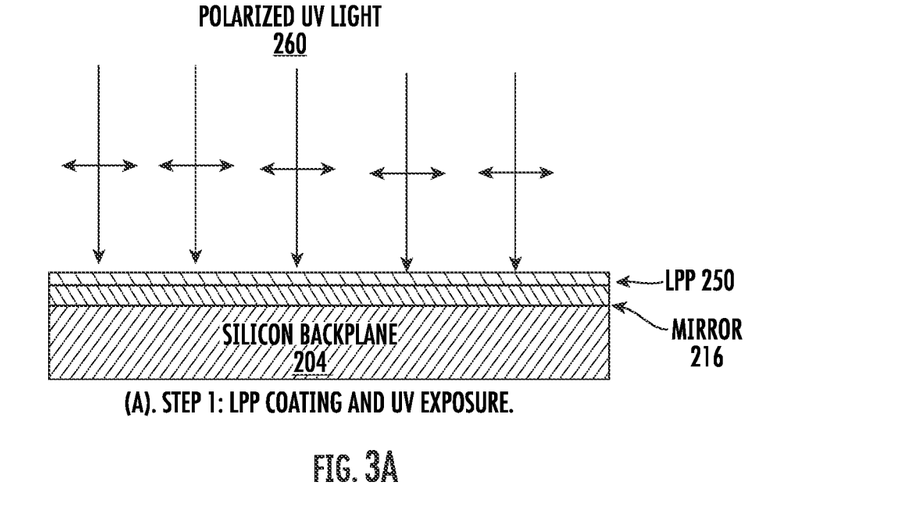
FIGS. 3A and 3B are cross sections illustrating processing steps in the fabrication of the quarter-wave plate (QWP) in accordance with some embodiments of the present inventive concept.

Processing steps in the fabrication of the QWP in accordance with some embodiments of the present inventive concept will now be discussed with respect to FIGS. 3A and 3B. Referring first to FIG. 3A, a linear photo-polymerization (LPP) layer 250 is provided on a surface of the silicon backplane 204 of the LCOS. For example, the LPP layer 250 may be provided by, for example, spin coating, evaporation, printing or the like. In some embodiments, the thickness of LPP layer may be from about 50 nm to 100 nm. As shown in FIG. 3A, the LPP 250 is exposed by a uniformly polarized ultraviolet (UV) light beam 260 with the polarization on the designed direction of QWP optical axis.

Figure 3B:
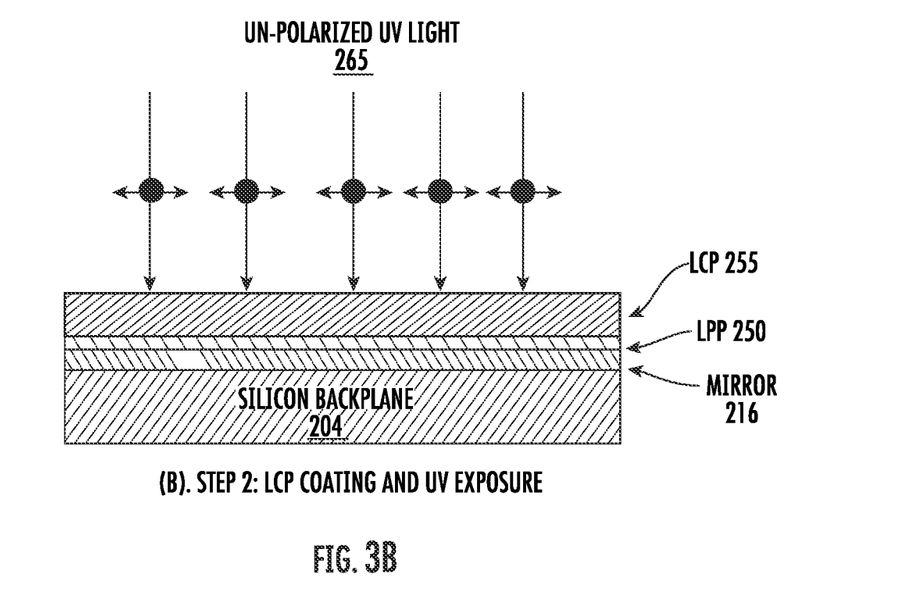

Referring now to FIG. 3B, a liquid crystal polymer (LCP) layer 255 is provided on the LPP layer 250 and is exposed with an un-polarized UV light beam 265. This process may be repeated several times in order to provide a uniform thickness of the QWP over the whole silicon backplane 204.

LCP materials are commercially available in the market which have a wide range of birefringence, for example, in a range of from about 0.1 to about 0.4. The selection of the LCP material is dependent on the LCOS applications. In general, a thinner QWP layer has a lower voltage drop across the layer. High birefringence LCP may be preferred for some applications. For example, for telecommunication applications, the used light wavelength may be around 1.6 um, so thickness of the QWP may be about 1.0 um if the LCP material having a 0.4 birefringence is used. For display applications, LCP materials with lower birefringence may be selected if necessary. For LCP material selection, multiple parameters, such as dielectric constant, birefringence, stability, and the like may be considered.

Figure 4:
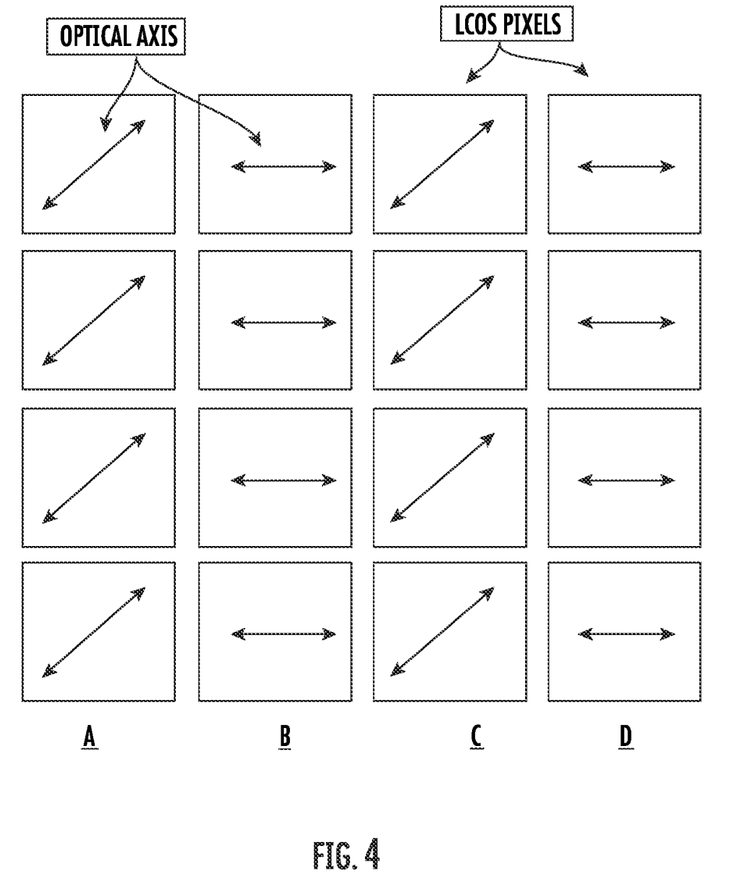
FIG. 4 is a diagram illustrating a waveplate optical axis diagram for use in accordance with some embodiments of the present inventive concept.

In some embodiments of the present inventive concept, a QWP can be either made as a uniform layer covering a whole pixel array on the silicon backplane or as a patterned array. Referring now to FIG. 4, example QWP patterns for use in accordance with some embodiments of the present inventive concept will be discussed. As illustrated, for example, LCP in columns A and C pixels has optical axis at 45° to the LC slow axis and the LCP in columns B and D pixels has 0°. It will be understood that other configurations can be designed depending on the LCOS applications. The configuration shown in FIG. 4 can provide advantages associated with both polarization independence as well as additional functionality to modify the polarization states. Thus, the configurable LCP layer can provide capability to create, on a pixel by pixel basis, polarization manipulating elements. This may provide an optimal phase manipulating matrix with the ability to address either two input polarizations and/or two output polarizations simultaneously.

As discussed above, in some embodiments of the present inventive concept, the PI-LCOS has a relatively thick dielectric layer to form the QWP between pixel mirror electrode and LC layer, resulting in a relatively large voltage drop across the QWP. As used herein, relatively thick, in general, refers to a thickness from about 0.4 um to about 4.0 um, depending on LCP birefringence and application light wavelength. Similarly, a relatively large voltage drop refers to a voltage drop of ⅛ to about ¼ of the applied voltage, depending on dielectric constants and birefringences of LC and LCP materials. Therefore, in order to fully drive LC in the PI-LCOS, a higher voltage than general LCOS can provide is generally required which will be discussed in following sections.

Figure 5A:
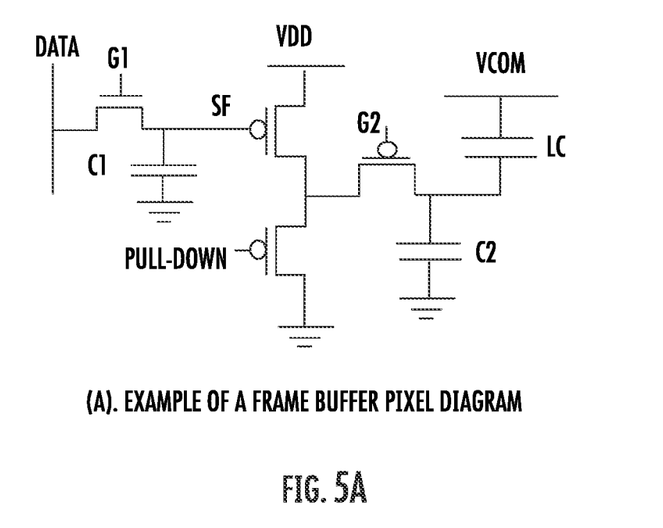
FIGS. 5A and 5B are diagrams illustrating examples of frame buffer pixel circuits and control signals in accordance with some embodiments of the present inventive concept.

To provide these higher voltages in the PI-LCOS, in some embodiments of the present inventive concept, frame buffer pixel driving circuits are provided. An example circuit is shown in FIG. 5A, which provides high voltages to drive the LC element. As illustrated in FIG. 5A, the frame buffer pixel circuit includes a data passing gate G1, a data storage capacitor C1, a source follower (SF) a frame data passing gate G2, and a capacitor C2. In operation, when G1 is open, data is transferred through G1 and stored on C1. When one frame of data are fully stored on C1 capacitors in all pixels, G2 in each pixel is opened at the same time, so data are transferred through G2 gates and stored on C2 capacitors in all pixels, which form voltage potentials to drive the LC. In the frame buffer pixel circuit of FIG. 5A, a pull-down transistor may be used to clear C2 before G2 is opened and then C2 is charged through the source follower SF after G2 is opened.

For most LCOS devices, the potential voltage of the common electrode $V_{com}$ on the glass substrate is fixed. In order to realize alternating current (AC) driving to the LC element, one frame image profile is designed into two profiles in which one has positive potential voltages and the other one has negative potential voltages as compared to $V_{com}$. These configured data profiles are loaded onto the LCOS silicon backplane in a time sequential manner. Therefore, the voltage range applied to the LC element is fully determined by the silicon backplane. A common LCOS silicon backplane, in general, is not capable to provide high enough voltages to fully modulate the LC element in the present disclosure of PI-LCOS. For example, a common LCOS pixel provides 5 V and Vcom has to be set at 2.5 V, resulting in voltage amplitude within 2.5 V. Such voltage amplitude is not large enough to fully drive LC element in PI-LCOS due to relatively large voltage drop across QWP layer. The significant advantage of the frame buffer pixel circuit based LCOS is that a high driving voltage can be applied by adjusting flip-flopped $V_{com}$, as shown in FIG. 5B.

It will be understood that the frame buffer pixel circuit of FIG. 5A is provided for example purposes only. Other circuit configurations may be used without departing from the scope of the present inventive concept.

Figure 5B:
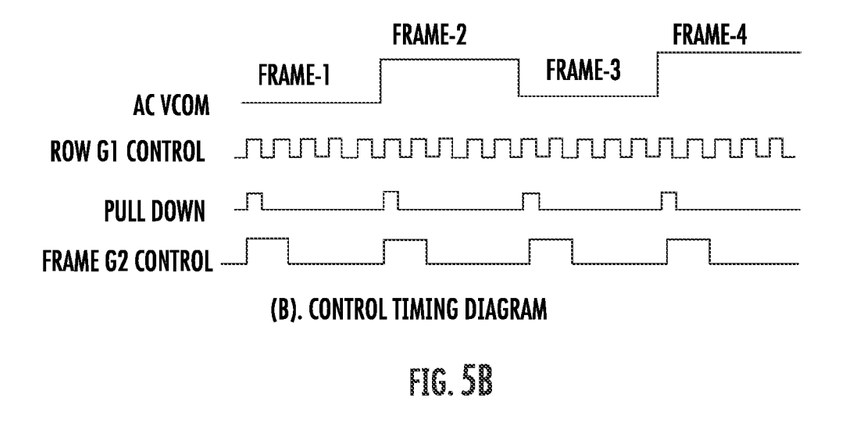

As shown in FIG. 5B, in operation, one frame voltage profile can be designed into two profiles in which one is correlated with positive $V^+_{com}$ and the other one is correlated with negative $V^-_{com}$, and then they are time sequentially loaded onto the silicon back plane. For example, when a pixel provides a potential voltage from 1 V to 4 V and $V^+$com is set to 10 V and $V^-$com is set to −5 V, a voltage of 6 V to 9 V can be applied to the LC element. Thus, with the frame buffer pixel circuit, the LCOS can easily provide high enough voltage to drive LC element even though some voltage drop happens across QWP layer. Vcom is provided by an outside electronic board, so it does not affect the silicon backplane circuit design and fabrication. Therefore, a general LCOS silicon backplane fabrication process can be used to fabricate such PI-LCOS silicon backplanes, resulting in low cost and high yield production.

Referring to FIG. 5B, the LCOS operational timing is discussed here. When Vcom is switched to Frame-1, for example, frame-1 data are transferred through G1 gates by open G1 gates time sequentially and stored on C1 capacitors in all pixels. Then, Vcom is switched to frame-2, and pull down gates and G2 gates in all pixels are open to clean C2 first and then charge C2 in all pixels. After G2 gates are closed, all frame-1 data are stored on C2 capacitors and voltages are simultaneously applied onto LC elements. When frame-1 data are displaying, frame-2 data are loaded onto pixels and stored on C1 capacitors. Such process is repeated in the whole operation time.

As discussed briefly above, some embodiments of the present inventive concept provide an improved liquid crystal based optical phase modulator device. In particular, a phase modulator is provided that is substantially polarization independent for arbitrary input polarizations. Furthermore, methods in accordance with embodiments of the present inventive concept may have several advantages over other polarization independent LCOS solutions, including, for example:

(1) A general LCOS silicon backplane fabrication process can be used, resulting in low cost and high yield production.

(2) The quarter-wave plate fabrication process is relatively simple, resulting in low cost manufacturing.

(3) The applied voltage amplitude can be easily adjusted to meet PI-LCOS' requirement through adjusting $V_{com}$ provided by an electronic board.

(4) The proposed LCOS potentially has high performance, including high brightness, low flicker effect, and the like.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A polarization insensitive optical phase modulator comprising:
    a glass substrate;
    a liquid crystal element;
    a first electrode on a first surface of the liquid crystal element adjacent the glass substrate;
    a second electrode on a second surface of the liquid crystal element, opposite the first surface, the first and second electrodes supplying an electric potential across the liquid crystal element to drive liquid crystals in a predetermined configuration;
    a silicon backplane on the second electrode opposite the liquid crystal element;
    wherein the first electrode is a transparent electrode to a selected wavelength and is on a surface of the glass substrate; and
    wherein the second electrode includes individually addressable pixels and reflection metal mirrors on pixel surfaces and is on a surface of the silicon backplane; and
    a polymer quarter-wave plate (QWP) between the second electrode and the liquid crystal element, the polymer QWP having an optical axis at 45 degrees to a liquid crystal slow axis,
    wherein reflected light has a 90 degree polarization rotation before traversing the liquid crystal element a second time; and
    wherein the reflected light passing through the liquid crystal element the second time has a different phase modulation from that of incident light passing through the liquid crystal element a first time, such that output light has a same phase modulation for both polarization components.

2. The polarization insensitive optical phase modulator of claim 1, wherein the polymer QWP comprises a quarter-wave plate for the selected wavelength.

3. The polarization insensitive optical phase modulator of claim 2, wherein selected wavelength has a range of from 0.4 um to 2.0 um for display and/or telecommunication applications.

4. The polarization insensitive optical phase modulator of claim 1, wherein the polymer QWP comprises a birefringent liquid crystal polymer on a surface of a linear photo-polymerization layer.

5. The polarization insensitive optical phase modulator of claim 4, wherein the liquid crystal polymer is exposed using an un-polarized ultraviolet (UV) light beam.

6. The polarization insensitive optical phase modulator of claim 5, further comprising a linear photo-polymerization element on a surface of a silicon backplane and exposed by a polarized UV light beam with a polarization direction at 45° to a slow axis of the liquid crystal element.

7. The polarization insensitive optical phase modulator of claim 1, wherein the polymer QWP comprise different patterns corresponding with different applications.

8. The polarization insensitive optical phase modulator of claim 1, wherein liquid crystal element has a thickness of from about 2 um to about 10 um.

9. The polarization insensitive optical phase modulator of claim 1, wherein the QWP has a thickness of from about 0.4 um to about 4 um.

10. The polarization insensitive optical phase modulator of claim 1, further comprising a first alignment layer between the first electrode and the liquid crystal element and a second alignment layer between the second electrode and the liquid crystal element.

11. A liquid crystal on silicon (LCOS) device providing a substantially polarization independent response to input light, the LCOS device comprising:
    a glass substrate having first and second opposing surfaces;
    a silicon backplane having first and second opposing surfaces;
    a liquid crystal material between the first surface of the glass substrate adjacent the liquid crystal material and the first surface of the silicon backplane adjacent the liquid crystal material;
    a first electrode on the glass substrate between the glass substrate and the liquid crystal material, the first electrode being a transparent electrode that provides a common potential voltage $V_{com}$; and
    a second electrode on a frame buffer pixel circuit that includes a first electric gate, a source follower, and a second electric gate,
    wherein the second electrode in a pixel is not limited to frame buffer pixel circuit.

12. The LCOS of claim 11, wherein the frame buffer pixel circuit comprises a frame image that is fully displayed while next frame data is loading.

13. The LCOS of claim 11, wherein the first electrode common potential voltage $V_{com}$ operates in a flip-flopped manner in sequential frames to realize alternating current (AC) driving to the liquid crystal element.

14. The LCOS of claim 11, wherein the first electrode Vcom is provided from an electronic driving board outside of a LCOS panel.

15. The LCOS of claim 14, further comprising an electronic board configured to provide an adjustable voltage to drive different liquid crystal elements.

16. A method of fabricating a polymer quarter-wave plate (QWP) for a polarization insensitive optical phase modulator, the method comprising:
    providing a silicon backplane;
    forming a second electrode on the silicon backplane, the second electrode including individually addressable pixels and reflection metal mirrors on pixel surfaces;
    forming a linear photo-polymerization (LPP) layer on the first electrode;
    exposing the LPP layer to polarized ultra-violet (UV) light;
    forming a liquid crystal polymer (LCP) layer on the exposed LPP layer; and
    exposing the LCP layer to un-polarized UV light to provide the polymer quarter-wave plate (QWP) between the second electrode and a liquid crystal element.

17. The method of claim 16, wherein the polymer QWP has an optical axis at 45 degrees to a liquid crystal slow axis.

18. The method of claim 16, wherein reflected light has a 90 degree polarization rotation before traversing the liquid crystal element a second time.

19. The method of claim 16, wherein the QWP has a thickness of from about 0.4 um to about 4 um.

* * * * *

UNITED STATES PATENT AND TRADEMARK OFFICE
CERTIFICATE OF CORRECTION

| | | |
|---|---|---|
| PATENT NO. | : 11,442,314 B2 | Page 1 of 1 |
| APPLICATION NO. | : 17/393750 | |
| DATED | : September 13, 2022 | |
| INVENTOR(S) | : Chongchang Mao | |

It is certified that error appears in the above-identified patent and that said Letters Patent is hereby corrected as shown below:

On the Title Page (56) References Cited, U.S. Patent Documents, Page 2: Please correct "9,065,707 B2* 6/2015 Frisken" to read -- 9,065,707 B2* 6/2015 Frisken et al. --

In the Specification

Column 5, Line 66: Please correct "(A14 waveplate)" to read -- ($\lambda$/4 waveplate) --

Column 8, Line 60: Please correct "adjusting $V_{co}m$" to read -- adjusting $V_{com}$ --

Signed and Sealed this
Eighteenth Day of October, 2022

*Katherine Kelly Vidal*

Katherine Kelly Vidal
*Director of the United States Patent and Trademark Office*